United States Patent [19]
Anderson

[11] Patent Number: 6,084,764
[45] Date of Patent: Jul. 4, 2000

[54] CAPACITOR DISCONNECTING ASSEMBLY

[75] Inventor: W. Kyle Anderson, Rockford, Ill.

[73] Assignee: Hamilton Sundstrand Corporation, Rockford, Ill.

[21] Appl. No.: 09/218,149

[22] Filed: Dec. 21, 1998

[51] Int. Cl.$^7$ .......................... H01G 2/00; H01G 4/228; H01G 4/38
[52] U.S. Cl. ..................... 361/272; 361/306.1; 361/811; 361/328
[58] Field of Search ..................... 361/272, 282, 361/283.1, 306.1, 301.2, 302, 308.1, 308.3, 328–330, 784, 790, 713, 807, 809, 811, 785; 439/842–844, 851, 82, 876; 174/263, 266; 338/315, 318

[56] References Cited

U.S. PATENT DOCUMENTS

| | | | |
|---|---|---|---|
| 1,990,819 | 2/1935 | Danziger | 175/41 |
| 2,907,976 | 10/1959 | Damon | 339/258 |
| 3,177,405 | 4/1965 | Gray | 317/101 |
| 3,304,473 | 2/1967 | Netherwood et al. | 317/256 |
| 3,685,002 | 8/1972 | Kennedy | 339/17 |
| 4,106,068 | 8/1978 | Flanagan | 361/15 |
| 4,128,293 | 12/1978 | Paoli | 339/258 |
| 4,464,702 | 8/1984 | Miller et al. | 361/328 |
| 4,754,361 | 6/1988 | Venturini | 361/15 |
| 4,812,941 | 3/1989 | Rice et al. | 361/15 |
| 4,897,760 | 1/1990 | Bourbeau | 361/272 |
| 4,982,376 | 1/1991 | Megens et al. | 361/400 |
| 5,019,934 | 5/1991 | Bentley et al. | 361/15 |
| 5,083,927 | 1/1992 | Herard et al. | 439/80 |
| 5,222,899 | 6/1993 | Hulderman | 439/188 |
| 5,875,091 | 2/1999 | Ricken | 361/328 |

FOREIGN PATENT DOCUMENTS

64-57612  3/1989  Japan .

*Primary Examiner*—Hyung-Sub Sough
*Assistant Examiner*—Anthony Dinkins
*Attorney, Agent, or Firm*—Lawrence E. Crowe

[57] ABSTRACT

A capacitor assembly which positively disconnects failing capacitors is disclosed. This assembly will disconnect electrical power from a capacitor when internal pressure builds up inside the capacitor as a result of an internal short circuit. One or more capacitors are connected electrically into a circuit. Terminals are fixedly connected at each end of the capacitor. The protruding ends of the terminals slidably couple the capacitor to a source of alternating current (AC) power. The normal failure mode for capacitors is to develop internal short circuits. The failed capacitor then heats up rapidly and generates internal pressure. This pressure deforms the end portion of the capacitor. When the end of the capacitor moves in a longitudinal axis of motion, the slidable connection of the terminal is moved to a non-contacting position and the electrical connection is interrupted.

20 Claims, 10 Drawing Sheets

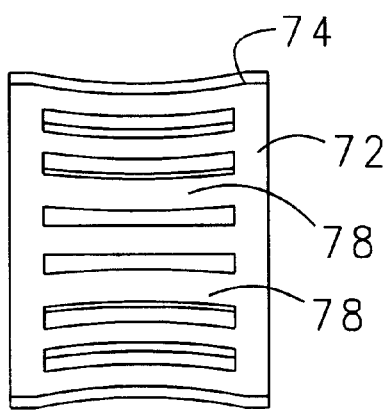
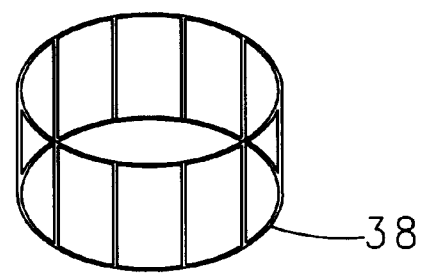
FIG. 8a
FIG. 8b

CAPACITOR DISCONNECTING ASSEMBLY

FIELD OF THE INVENTION

This invention relates to an AC film capacitor assembly which positively disconnects a capacitor upon an internal short. In particular, the assembly provides sliding contact between the terminals of the capacitor and a bus bar, such that a conductive portion of the terminals is in contact with the bus bar during normal operation, and the failure of the capacitor slides the conductive portion of the terminal out of contact, while sliding an insulated portion of the terminal into contact with the bus bar.

BACKGROUND OF THE INVENTION

Electrical and electronic applications require the use of capacitors in many circuits for power, control and conversion. Frequently, these capacitors must have great capability in both storage capacity and voltage. Film capacitors in particular have been used in many applications where a high storage capacity is desirable, such as in electric power generation and conversion. Frequently, many of these capacitors are employed in parallel in order to gain a multiplication of capacitance.

These capacitors can fail, sometimes bursting their seams and causing secondary damage. If a capacitor fails shorted, its normal failure mode, it generates gases and creates pressure inside the body of the capacitor. This causes the body of capacitor to bulge. If no relief is provided, generally in the form of an internal disconnect, the capacitor may even explode.

For these and other reasons, it is desirable to remove a failed capacitor from an electrical circuit as soon as possible after it has failed, preferably instantaneously. This problem has received attention from a number of sources over the years.

In several prior approaches to solving this problem, a capacitor is placed inside a housing, while the electrical terminals of the capacitor remain outside the housing. In one such method, electrical wires connect the capacitor to the terminals, and when the capacitor bulges, the wire is physically broken. In others, a fusible link or spring is used to break the connection. These solutions are less than optimal, because the hardware used for connecting and mounting, as well as the failed capacitor itself, are often damaged. They cannot be reused and must be replaced. These approaches are catalogued in U.S. Pat. Nos. 3,304,473, 4,106,068 4,754,361, 4,897,760 and 5,019,934.

U.S. Pat. No. 4,812,941 discloses a film capacitor wherein the end portion will physically lift off the internal contacts when it fails in this fashion. This method interrupts the circuit. However, the operation requires a far more elaborate construction than the capacitor itself, and this entire expensive structure is rendered useless upon failure. There is no possibility of reusing any of the deformed or broken internal components.

U.S. Pat. No. 5,222,899 features a repetitively useful contactor, spring driven and with a manual reset, which would be far too bulky for operation with capacitors used for smaller electrical circuits. Even with these devices, pressure inside a film capacitor can quickly build up, bulge outwardly, and without other intervention, relieve itself explosively, damaging itself and other hardware in the immediate vicinity.

SUMMARY

This invention overcomes the problems described above by providing a capacitor assembly in which the bulging motion of a failing capacitor slides the capacitor terminal out of contact with a bus bar. The capacitor assembly of the present invention provides sliding contact between a terminal of a capacitor and a bus bar, such that a conductive portion of the terminal is in contact with the bus bar during normal operation, and the failure of the capacitor slides the conductive portion of the terminal out of contact with the bus bar. This assembly thus assures a graceful failure mechanism, in which the failure of a capacitor does not affect the operation of the other components in the electrical circuit in which the capacitor is used.

One embodiment of the invention includes a housing, inside of which is mounted a bus bar and a capacitor. The capacitor is a cylindrical film capacitor, with a terminal extending from one end. The terminal of the capacitor has a conductive portion, providing contact with an external electrical circuit or source of power, and an insulative portion. The insulative portion of the terminal allows no electrical contact to external circuits, such as a bus bar. The capacitor and the terminal form an axis of motion, such that when the capacitor fails by bulging, the terminal will move along that axis.

Prior to failure, the capacitor is mounted with the conductive portion of the terminal in a first position along the axis of motion, wherein the conductive portion of the terminal is in electrical contact with the bus bar. The insulative portion of the terminal is configured in such a manner that when the capacitor fails, and bulges outwardly, the terminal moves by sliding into a second position along the axis of motion. In reaching this second position, the conductive portion of the terminal slides out of contact with the bus bar, and the insulative portion of the capacitor terminal slides into contact with the bus bar. Thus, the sliding motion of the terminal automatically removes the capacitor from electrical contact with the bus bar.

In another aspect of the invention, an insert of electrically conductive material may be included between the bus bar and the conductive portion of the terminal. This insert is desirably made of a relatively compliant, highly conductive material, such as beryllium-copper. This insert helps to achieve good electrical contact between the bus bar and the terminal of the capacitor. The insert may also be plated with gold or silver, to further enhance electrical conductivity and resist corrosion.

The invention may also be practiced by connecting several capacitors in parallel to provide for additional capacitance in a electrical circuit. Thus, if one capacitor does not by itself provide sufficient capacitance for a circuit, more capacitors may be added as desired to achieve the desired result. Each of the capacitors is in electrical contact through its own terminal, as described above for the first capacitor.

When several capacitors are used in parallel, a failure may involve only one of the capacitors. With this invention, an individual capacitor that fails positively removes itself from the circuit as soon as pressure builds up inside the individual capacitor. The housing, the bus bars and any other mounting hardware used are not destroyed by the action of a capacitor which fails. Only the capacitor, which removes itself, is affected. No other part is destroyed nor is any additional expense incurred in this graceful failure mechanism. The remaining capacitors continue to function, albeit at a lower combined capacitance rating.

While the above descriptions focus on a single terminal of the capacitors, it will be recognized that useful capacitors have two terminals. Those skilled in the art will recognize that a second terminal, thus far not mentioned, may be connected to a second bus bar or to the opposite part of an external electrical circuit in any conventional manner. Thus the second terminal may be attached to the second bus bar by soldering, brazing, crimping or welding or any other desired manner.

In a variation of the invention, the second terminal may also be mounted to the second bus bar in the same manner as the first terminal is mounted to the first bus bar. That is, the second terminal may also extend along the same axis of motion as the first terminal and the capacitor; and the second terminal may also have a conductive portion and an electrically insulative portion. The second terminal may be mounted such that it is in a first position in electrical contact with the second bus bar prior to failure of the capacitor, and the second terminal will be in a second position with the electrically insulative portion of the terminal in contact with the bus bar after failure of the capacitor.

It will be appreciated that there are many ways to practice the invention. In one embodiment, a wire may internally link the capacitor film to the capacitor terminal. When the capacitor fails, the capacitor bulge disconnects the terminal from the external connection; in addition, the bulging causes the internal wire to break, and encourages even faster breaking of the electrical connection. In other embodiments, the terminals of the capacitor may comprise threaded rods for easier assembly and disassembly.

The housings used may be constructed of metallic materials with electric insulation used in strategic areas, or the housings may be constructed of non-metallic, non-conductive materials. Other embodiments and advantages will become apparent from the following specification, in conjunction with the accompanying drawings.

BRIEF DESCRIPTION OF THE DRAWINGS

FIG. 8a shows the construction of the conductive insert, while FIG. 8b is a view of the conductive insert itself.

DESCRIPTION OF THE INVENTION

Figure 1:
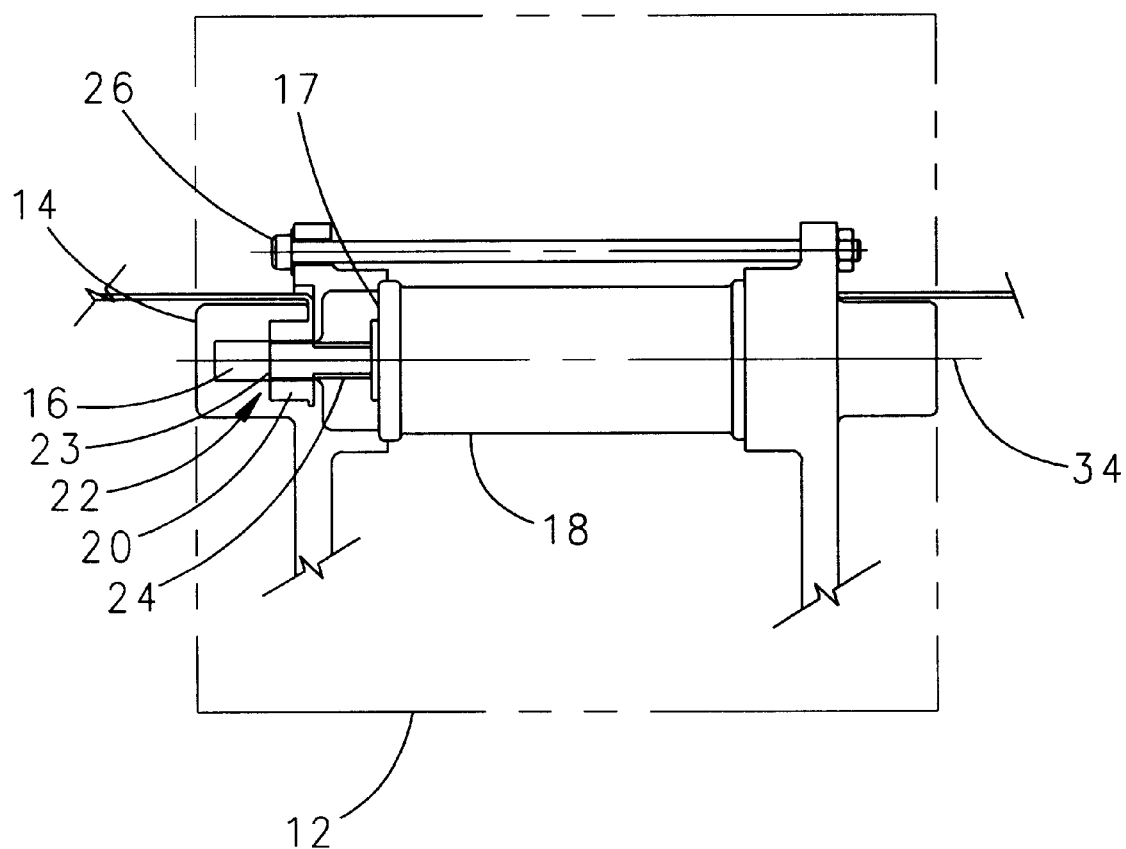
FIG. 1 is a side view of a film capacitor in an electrical application, showing the general arrangement of a capacitor and its terminals, conductive at the tips, which provide the electrical connections between the capacitors and the bus bars.

FIG. 1 illustrates an exemplary embodiment of a capacitor assembly 10 according to the invention. The capacitor assembly 10 includes a housing 12, a bus bar 20 mounted within the housing 12, and a capacitor 18 also mounted within the housing 12. Insulating material 14 separates the housing 12 from the bus bar 20. The capacitor 18 has an electrical terminal 22, which extends along an axis of motion 34 formed by the capacitor 18 and the terminal 22. The terminal 22 is composed primarily of electrically conductive materials 23, such as metals, but the terminal 22 also includes a separate and distinct portion of non-conductive material 24. FIG. 1 illustrates the capacitor assembly 10 prior to failure, with the capacitor 18 and the terminal 22 along the axis of motion 34. The terminal 22 is in a first position 17, as shown in FIG. 1, along the axis of motion 34 with the electrically conductive portion 23 of the terminal 22, in electrical contact with the bus bar 20. Fasteners 26 may be used to facilitate assembly.

As shown in FIG. 1, one embodiment of the invention features a means for accommodating the terminal 22 when it slides out of contact with the bus bar 20. A preferred means is a recess 16 in non-conducting insulating material 14 into which the terminal 22 slides upon failure. When the capacitor 18 fails, it activates the sliding motion of the connecting terminal 22 of capacitor 18 into recess 16. What is necessary is to provide a means for accommodating that portion of the terminal which moves out of contact with the bus bar or source of power in a manner allowing the terminal to move freely out of contact with the bus bar.

Figure 2:
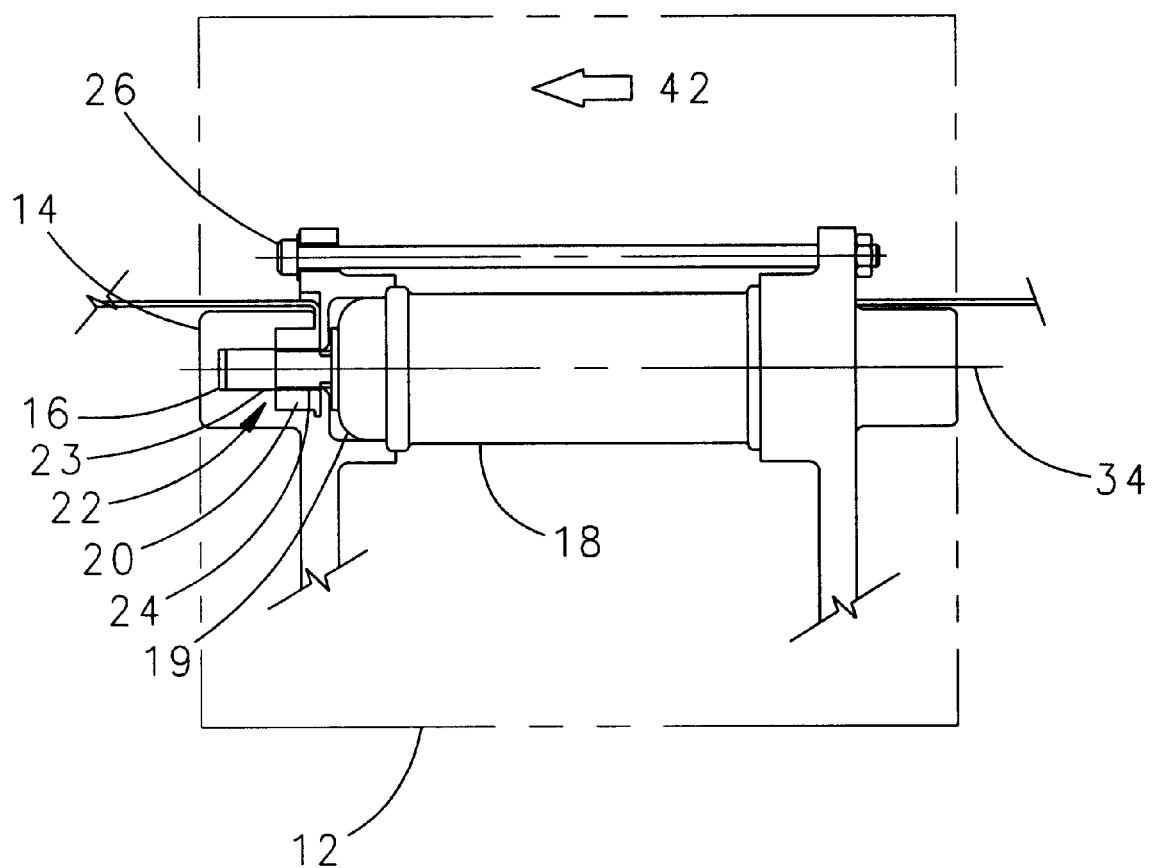
FIG. 2 discloses the operation of the disconnecting apparatus by movement of the capacitor terminal when the capacitor fails.

FIG. 2 illustrates the capacitor assembly 10 after failure. A terminal 22 of capacitor 18 is depicted in a second position 19 in FIG. 2 along the axis of motion 34. The bulging of the capacitor 18 upon failure has caused the terminal 22 to move along the direction of arrow 42 into recess 16. In this second position, the non-conductive portion 24 of terminal 22 is now in contact with the bus bar 20, and the conductive portion 23 of the terminal 22 is not in contact with the bus bar 20. The bulging of capacitor 18 has disconnected terminal 22 from bus bar 20. Fastener 26, if used, is sufficiently strong to resist bulging forces and to retain the capacitor assembly in its assembled state.

FIGS. 1 and 2 also illustrate other aspects of the invention that have been found to be useful. The bus bars mounted in the housing are made of conductive metals, well known to those skilled in the art, such as copper or aluminum. In a preferred embodiment of the invention, the bus bars are made from copper and are plated with a thin plating of compliant material, such as silver, in order to enhance electrical conductivity and to resist corrosion. The bus bar bore, wherein contact is made between the bus bar and the conductive portion of the terminal, is the area most advantageously employing the plating.

In mounting the capacitor 18 inside the housing 12, insulating materials 14 are useful in preventing electrical contact between the bus bar 20 and the housing 12. These materials may be mounted with mechanical fasteners 26 or may be mounted in other ways, such as with adhesives, or merely sandwiched between the bus bar 20 and the housing 12.

The housing for the capacitors may be any convenient material suitable for the application and conditions of use. For example, it may be made of metal, such as steel or aluminum or other convenient material. It could just as well be made of a molded thermoplastic or thermoset material, reinforced with fibers or not as desired. Examples of housing materials would be 6061 aluminum or molded acrylonitrile-butadiene-styrene (ABS) plastic material. Examples of commercially-available capacitors of this type include film capacitors made by Sundstrand or ITW Paktron.

In a preferred embodiment of the invention, the insulating material 14 is fabricated entirely from a non-conducting material, or may be made from any convenient material with an insulating material used where necessary to mount the bus bars and insulate them from the housing. The insulating material may be molded from a non-conductive material, such as any thermoplastic or thermoset resin, reinforced or not, as required by structural needs.

Useful insulating materials include Kapton® or Nomex® from the duPont Co. Other insulating materials, such as any convenient grade of fiberglass or other dielectric material may also be used. If it is desired to secure them in place with adhesive means, non-conductive adhesives may be used. Examples would be cyanoacrylates, epoxies, PVA adhesives or any convenient, non-electrically-conductive adhesive.

The conductive part 23 of the terminals 22 may be made of any suitable grade of copper or aluminum or other alloy, such as steel, and sized to safely conduct the desired amount of current for the proper functioning of the capacitor in its intended use. FIG. 3 depicts a terminal 22 made from a conductive portion 23, and having an outer portion 24 made of insulating material. The terminals may be of a substantially longitudinal cylindrical construction as shown, or they may be any other convenient shape.

Figure 3A:
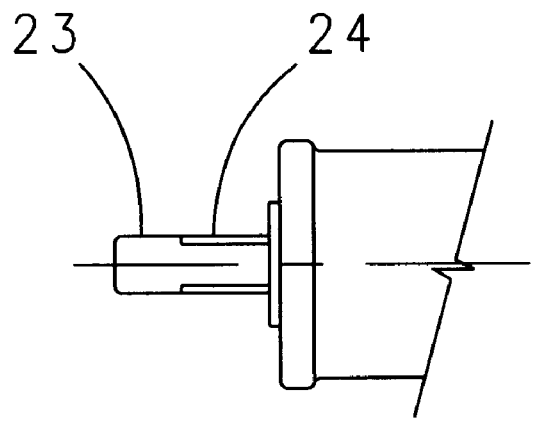
FIGS. 3a and 3b are removed views of a terminal of the invention, showing both conductive and non-conductive portions.
Figure 3B:
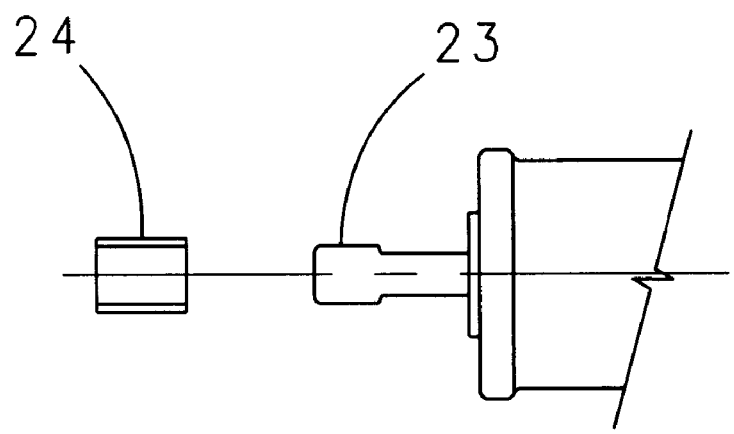

The insulative portion 24 of the terminal 22, as shown in FIG. 3a, is fabricated from typical insulative materials. Preferred embodiments include heat-shrink tubing, such as made from polymeric or rubber materials, such as poly-vinyl chloride or silicone-based materials. A short length of such tubing is cut and placed over a portion of a metallic terminal. Using a heat-gun (such as a hair dryer), the tubing is shrunk in place over the terminal. Alternatively, insulative tape, such as Kapton® tape may be used, or tape made from other insulative material, such as Nomex®. It will be appreciated that insulative materials other than tape will also suffice, such as fiberglass tubing. FIG. 3b shows the terminal 22 before the insulation portion 24 is assembled onto the conductive portion 23.

Figure 4:
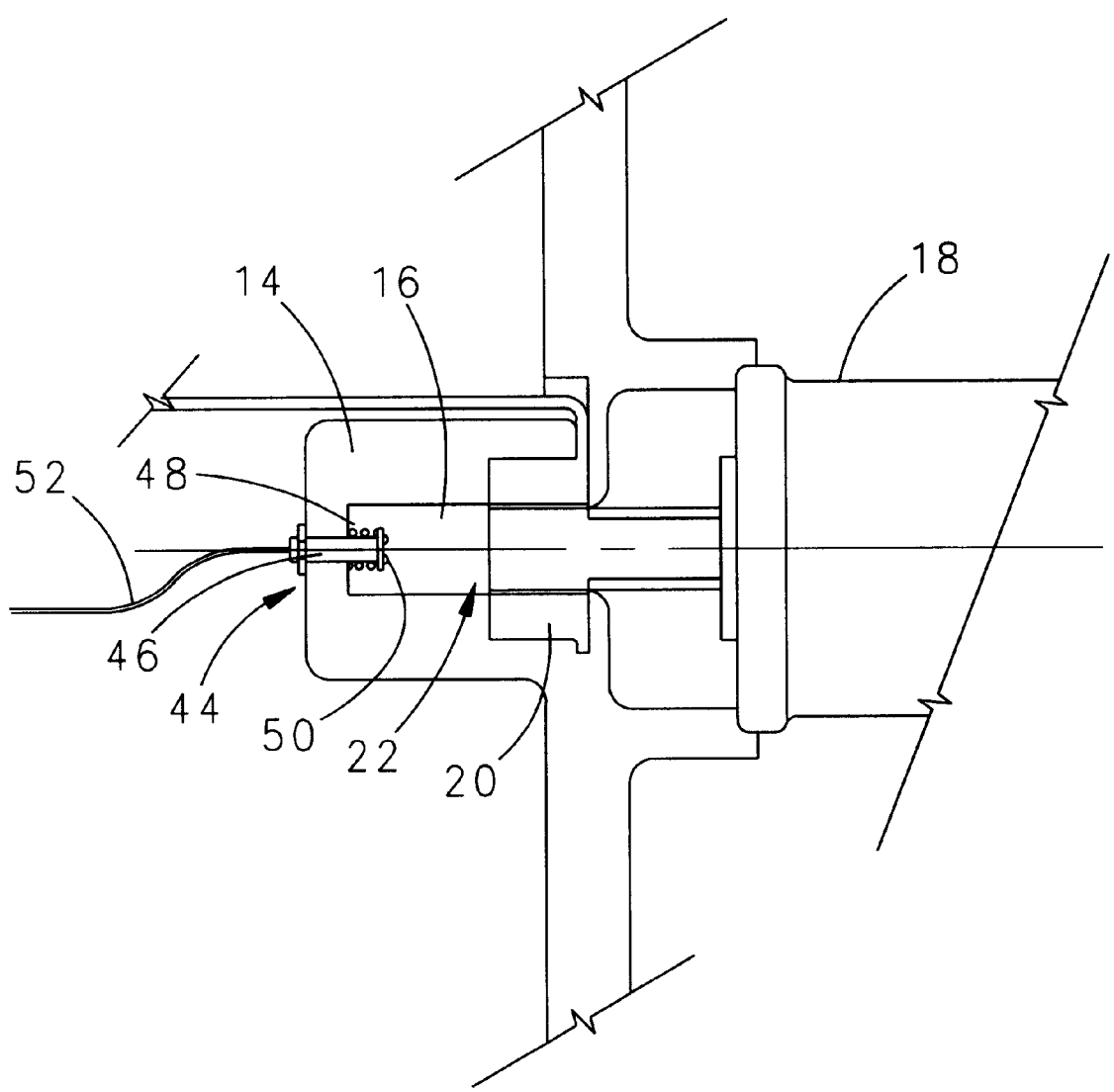
FIG. 4 depicts an embodiment in which an indicator switch is located in the mounting hardware to signal which capacitor has failed.

In one embodiment of the invention, as shown in FIG. 4, a small switch 44 may be located in the bottom of the recess 16 of the insulator 14. The switch is actuated when struck by the end of the terminal 22 upon failure of the capacitor 18 and its disengagement from bus bar 20. The signal from this switch may be monitored to determine whether a capacitor failure has occurred. The switch 44 may consist of a plunger 46 made of an insulating material, and actuated by the end of the terminal 22. A spring 48 allows the terminal 22 to continue its stroke after initial switch actuation, and a set of contact points 50 engage when the switch is actuated. The switch is retained in the insulator 14. The signal is transmitted by signal wires 52.

Figure 5:
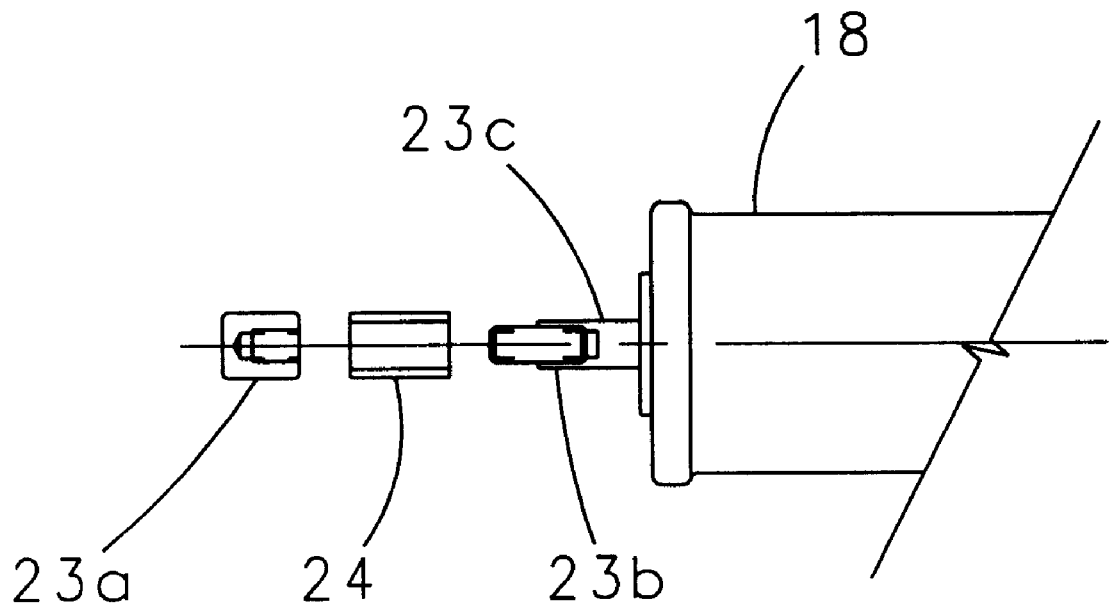
FIGS. 5 and 6 depict two alternate embodiments of terminals for the capacitors.

In another embodiment of the invention, depicted in FIG. 5, a terminal 22 comprises conductive parts 23a, 23b, and 23c. Threaded rod 23b is inserted into conductor 23c, which is an integral part of a capacitor 18. When cap 23a threads onto threaded rod 23b, the cap 23a is the portion of the terminal 22 that contacts the bus bar. Insulating element 24 then insulates from electrical contact a portion of the exposed surface of the rod. In operation, the terminal cap 23a, shown with female threads, is then threaded onto the threaded rod 23b, shown with matching male threads. As described below, the nonconductive portion 24 of the terminal 22 may be attached as desired in the sequence of assembly.

Figure 6:
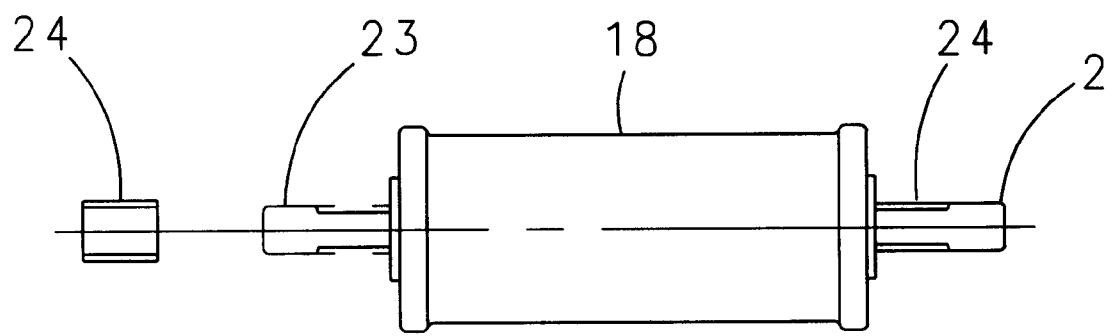

FIG. 6 depicts the terminals 22 assembled onto a capacitor 18, in which the terminals are constructed as an integral part of the capacitor, rather than being added in assembly. In FIG. 6, insulating element 24 is secured around the conducting portion 23 of the terminals 22 to provide the necessary insulation upon failure of the capacitor.

Figure 7:
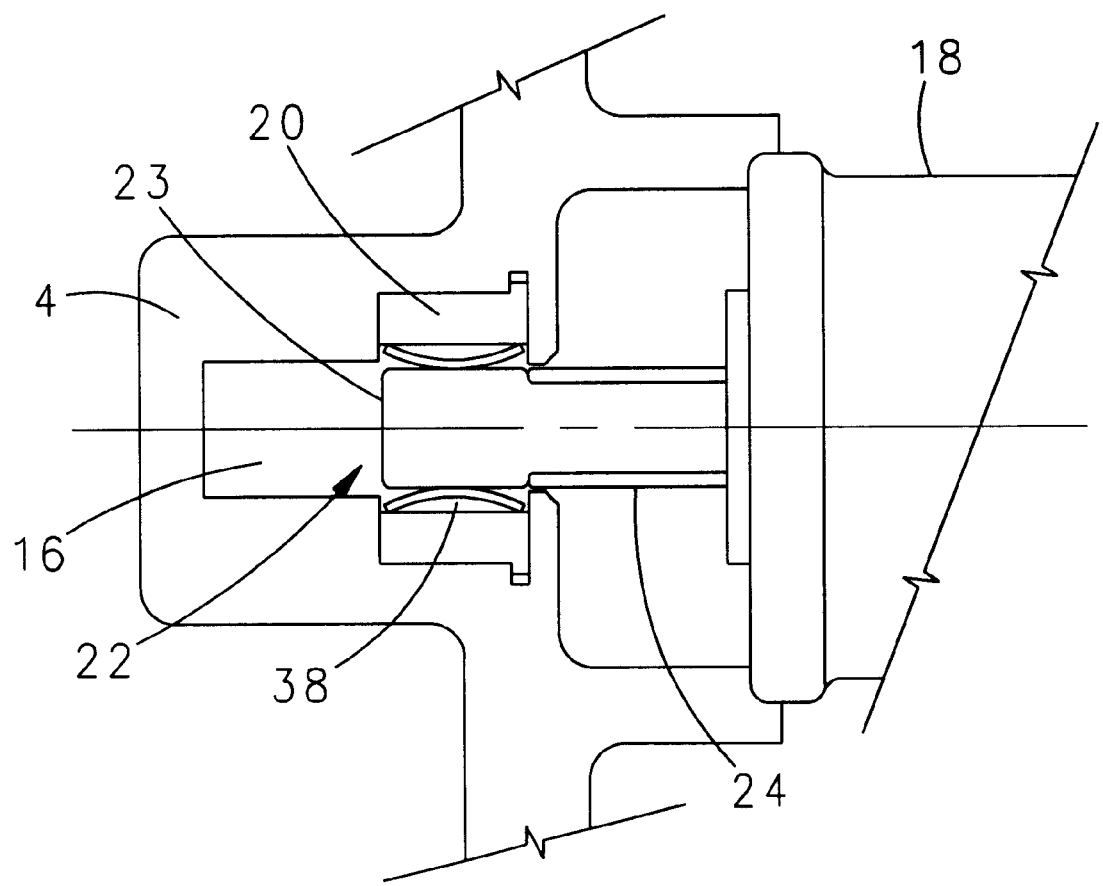
FIG. 7 is a more detailed view of the capacitor terminal showing a conductive insert between the capacitor and a bus bar.

In some embodiments of the invention, it is beneficial to include an electrically conductive insert 38 between the terminal and the bus bar 20, as shown in FIG. 7. These inserts are generally in the form of a cylindrical "squirrel cage," or slightly barrel-shaped cage, open on the ends. The inserts are generally made from strips of metal, subjected to a piercing or blanking operation. FIG. 8a illustrates how the blanking operation results in a strip of metal 72 which resembles a "ladder," with narrow louvers of metal 74 and rectangular spaces 76 between the louvers. Inserts of a particular size are made by cutting to a suitable length and forming the strip into a cylinder. The ends may be joined together as desired, and annealed or heat-treated as desired.

Inserts such as these are made from a conductive metal, such as beryllium-copper, or other conductive materials, in order to enhance electrical conductivity. in a preferred embodiment of the invention, the insert is then plated with a compliant metal, such as gold or silver, to provide enhanced electrical conductivity and corrosion protection.

Referring to FIG. 7, in a highly preferred embodiment of the invention, the conductive part 23 of terminal 22, shown with non-conductive area 24, is plated with a scuff resistant material such as nickel, and the bus bar 20 is plated with silver. The combination of a hard surface such as nickel, in combination with a compliant gold or silver plating on the insert 38, facilitates the sliding motion of the conductive portion 23 of terminal 22 of capacitor 18 when it fails and slides out of electrical contact and into the recess 16 provided in insulator 14. In addition, even a thin plating will help avoid long-term corrosion of the base metal of the insert.

Such an insert 38, as shown in FIG. 8b, is useful in urging the terminal against the corresponding contacting surfaces of the bus bar when assembling the capacitors. The insert is helpful in avoiding a need for tight tolerances on the machining of the terminals and the bus bar points of contact. These inserts enhance the electrical conductivity of the connection between the terminal and the bus bar. Inserts such as these are available from Multi-Contact USA, Santa Rosa, Calif.

Figure 9:
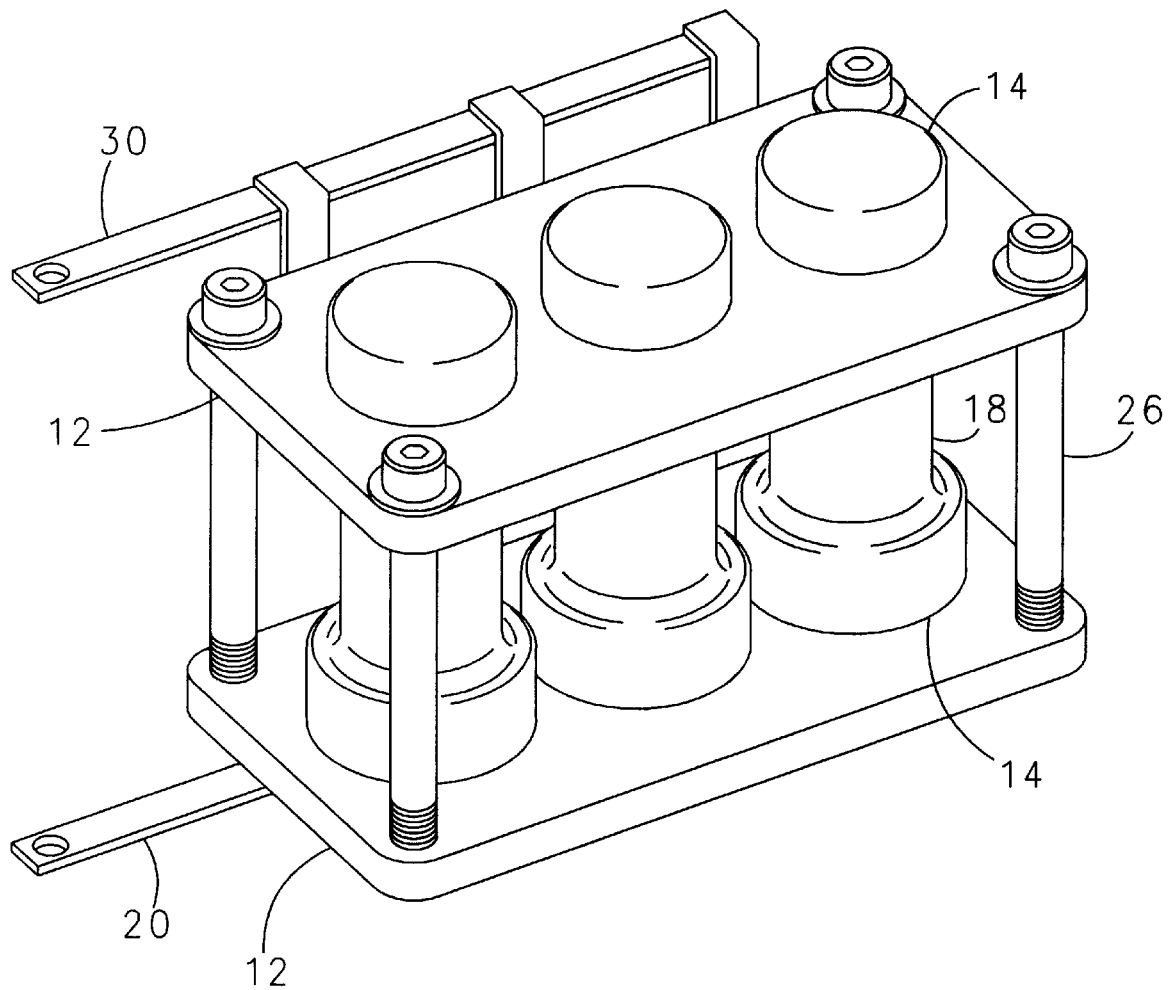
FIG. 9 depicts several capacitors in a capacitor assembly.

FIG. 9 depicts yet another embodiment of the capacitor assembly 10, in which three capacitors 18 are joined in a housing 12. The two parts of the housing 12 are joined by fasteners 26. The capacitors are in contact with bus bars 20 and 30 at their opposite ends. Insulators 14 are visible at both ends of the capacitors 18, concealing the terminals and other working parts of the assembly.

Figure 10:
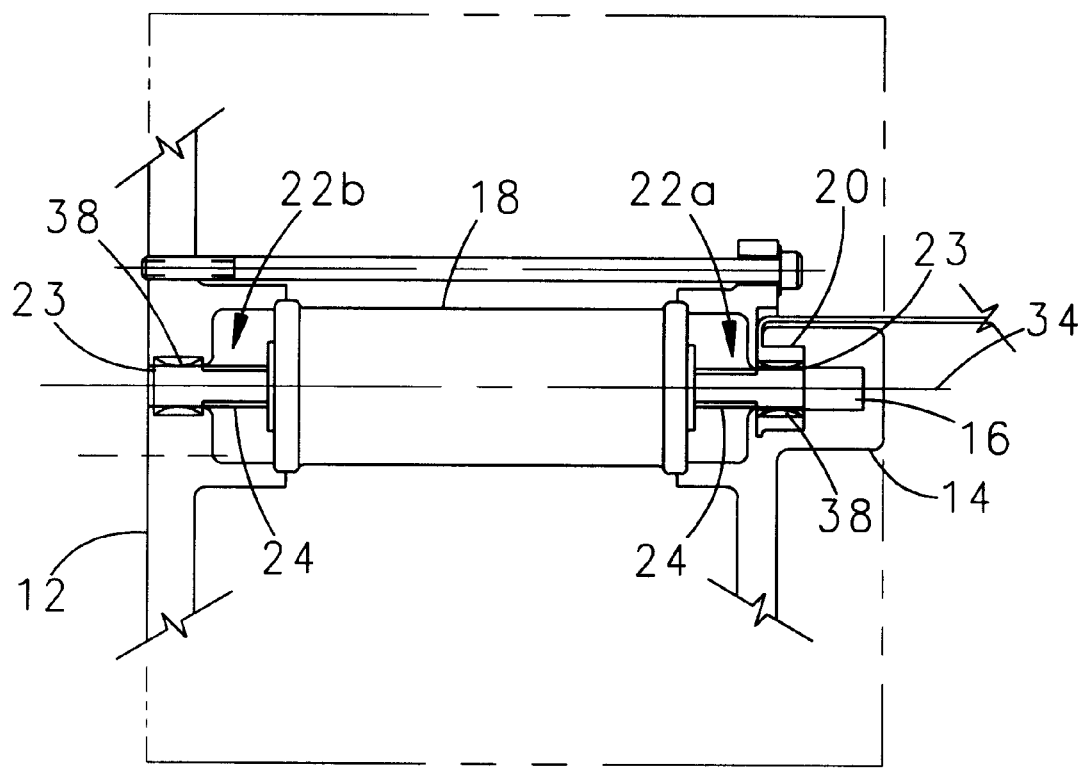
FIG. 10 is a side view of a capacitor showing terminals in slidable contact at both ends, wherein one terminal electrically connects to a grounded housing.

In a preferred embodiment of the invention, as shown in FIG. 10, terminals 22 are used at both ends of a capacitor 18. The invention will function as follows. One or more capacitors 18 are contained in housing 12 and connected to a source of AC power on one end by bus bar 20, and are grounded to the housing 12 on the other end. In this embodiment, electrically conductive inserts 38 are used between the conductive part 23 of the terminals 22a and 22b, and bus bar 20 and housing 12. An electrically insulative portion 24 forms part of each terminal 22a and 22b, as previously. Insulative material 14 and recess 16 are provided for terminal 22a in contact with bus bar 20, for accommodation of the capacitor terminal 22a upon failure. Because the housing 12 provides the electrical ground connection on the opposite end of capacitor 18, no insulative material or recess is necessary for accommodation of terminal 22b upon failure. When capacitor 18 fails, the bulging of the capacitor may cause terminal 22b to slide out of contact with the grounded housing 12, but the conductive portion 23 of terminal 22b will extend beyond the grounded housing 12, and the non-conductive portion 24 of terminal 22b will be in contact with the housing, breaking the electrical connection.

This construction of the invention will allow both for electrical connection to ground and also for improved heat transfer. Conductive heat transfer will then occur between the housing 12, and both the body of the capacitor 18 and the conductive portion 23 of the terminal 22, during normal operation of the capacitor. When the capacitor fails, and the terminals disconnect the capacitor electrically, the position of the capacitor 18 itself with respect to housing 12 does not change. Either or both of terminals 22a and 22b will move out of electrical contact, but the body of the capacitor 18 will remain in contact with housing 12.

When capacitor 18 fails, as previously discussed, the capacitor bulges along the axis of motion 34 and either or both of the terminals 22a and 22b disengage from bus bars 20 or housing 12. The invention will function in the same way as with a single terminal, but with the possibility of a quicker disconnect because the bulging of the capacitor can cause a disconnect at either end of the capacitor 18.

The foregoing description of preferred embodiments of the invention has been presented for purposes of illustration and description, and is not intended to be exhaustive or to limit the invention to the precise form disclosed. I chose this description to explain the principles of my invention and how to apply those principles. These descriptions will enable others skilled in the art to utilize my invention in a number of embodiments and with modifications suited to particular uses. I intend that the scope of my invention not be limited by this specification, but be defined by the claims set forth below.

I claim:

1. A capacitor assembly comprising:
   a housing;
   a bus bar mounted within said housing;
   a capacitor mounted within said housing and having an electrical terminal extending along an axis of motion of said terminal following a failure of said capacitor; and
   said terminal having separate electrically conductive and electrically insulative portions;
   said capacitor being mounted with respect to said bus bar and said terminal being configured in such a manner that prior to failure of said capacitor, said terminal is in a first position along said axis of motion wherein said electrically conductive portion of said terminal is in slidable electrical contact with said bus bar; and
   following failure of said capacitor, said terminal is in a second position along said axis of motion, with the electrically insulative portion of said terminal in slidable contact with said bus bar.

2. A capacitor assembly according to claim 1, wherein the housing is made from an electrically non-conductive material.

3. A capacitor assembly according to claim 1, wherein the housing further comprises non-conductive means for accommodating the conductive portion of the terminal after the capacitor fails.

4. A capacitor assembly according to claim 1, wherein the assembly further includes a switch to signal the failure the capacitor.

5. A capacitor assembly according to claim 1, wherein the terminal is manufactured as in integral part of the capacitor, and the conductive portion of the terminal is plated with nickel.

6. A capacitor assembly according to claim 1, wherein said the insulated portion of the terminal is fabricated from material selected from the group consisting of rubber tubing, polymeric tubing, heat-shrink tubing, and tape.

7. A capacitor assembly according to claim 1, further comprising an electrically conductive insert between the electrically conductive portion of the terminal and the bus bar, wherein the insert is made from beryllium-copper, and said insert is plated with a metal selected from the group consisting of gold and silver, and the bus bar is plated with a metal selected from the group consisting of gold and silver.

8. A capacitor assembly according to claim 1, further comprising one or more additional capacitors mounted within said housing, each capacitor including at least one said terminal slidably connected to said bus bar, in a first position providing electrical contact between the bus bar and the electrically conductive portion of the terminal prior to failure of the capacitor, and in a second position having contact between the bus bar and the electrically insulative portion of the terminal after the capacitor fails.

9. A capacitor assembly according to claim 8, wherein one end of said capacitors is grounded to the housing.

10. A capacitor assembly according to claim 8, wherein the terminal of any capacitor which fails moves along said axis of motion from said first position to said second position, and the capacitors remaining are not affected by the failing capacitor.

11. A capacitor assembly according to claim 8, further including an electrically conductive insert between the conductive portion of each terminal and the bus bar, wherein the insert is plated with a metal selected from the group consisting of gold and silver, and the bus bar is plated with a metal selected from the group consisting of gold and silver.

12. A capacitor assembly comprising:
    a housing;
    a first bus bar and a second bus bar mounted within said housing;
    a capacitor mounted within said housing and having a first and a second electrical terminal extending along an axis of motion of said terminal following a failure of said capacitor; and
    said terminals having separate electrically conductive and electrically insulative portions;
    said capacitor being mounted with respect to said bus bars and said terminals being configured in such a manner that prior to failure of said capacitor, said terminals are in a first position along said axis of motion wherein said electrically conductive portions of said first and second terminals are in slidable electrical contact respectively with said first and second bus bars; and
    following failure of said capacitor, said first terminal is in a second position along said axis of motion, with the electrically insulative portion of said first terminal in slidable contact with said first bus bar, or alternatively, said second terminal is in a second position along said axis of motion, with the electrically insulative portion of said second terminal in slidable contact with said second bus bar.

13. A capacitor assembly according to claim 12, wherein the conductive portion of the terminals are manufactured as an integral part of the capacitors, and the conductive portion of the terminals are plated with nickel.

14. A capacitor assembly according to claim 12, wherein one or more of the capacitors further comprises a switch to signal the failure of the capacitor.

15. A capacitor assembly according to claim 12, wherein the terminals are mounted to the capacitors via threaded connections.

16. A capacitor assembly according to claim 12, wherein the insulated portion of the terminals is fabricated from materials selected from the group consisting of rubber tubing, polymeric tubing, heat-shrink tubing, and tape.

17. A capacitor assembly according to claim 12, further comprising an insert between the electrically conductive portion of each terminal and each said bus bar for enhancing the electrical connection between the terminal and the bus bar, wherein the insert is plated with a metal selected from the group consisting of gold and silver, and the bus bars are plated with a metal selected from the group consisting of gold and silver.

18. A capacitor assembly according to claim 12, further comprising one or more additional capacitors mounted within the housing, each capacitor having first and second electrical terminals, said capacitors being mounted with respect to said bus bar and said terminals being configured in such a manner that prior to failure of said capacitor each said first terminal is in a first position along said axis of motion wherein said electrically conductive portions of said first terminals are in slidable electrical contact with said first bus bar, and said second terminal of each capacitor is in a first position along said axis of motion wherein electrically conductive portions of said second terminals are in slidable electrical contact with said second bus bar; and after failure of a capacitor, said first terminal of said failed capacitor is in a second position along said axis of motion, with the electrically insulative portion of said first terminal in slidable contact with said first bus bar, or alternatively, said second terminal of said failed capacitor is in a second position along said axis of motion, with the electrically insulative portion of said second terminal in slidable contact with said second bus bar.

19. A capacitor assembly according to claim 18, wherein the terminal of any capacitor which fails moves along said axis of motion from said first position to said second position, and the capacitors remaining are not affected by said failing capacitor.

20. A capacitor assembly according to claim 12 or claim 18, wherein one end of said capacitors is grounded to the housing, in order to provide enhanced heat transfer between the capacitors and the housing.

* * * * *